United States Patent
Iwasaki

(10) Patent No.: US 8,208,664 B2
(45) Date of Patent: Jun. 26, 2012

(54) AUDIO TRANSMISSION SYSTEM AND COMMUNICATION CONFERENCE DEVICE

(75) Inventor: Yasutaka Iwasaki, Kasugai (JP)

(73) Assignee: Yamaha Corporation, Hamamatsu-shi (JP)

( * ) Notice: Subject to any disclaimer, the term of this patent is extended or adjusted under 35 U.S.C. 154(b) by 1156 days.

(21) Appl. No.: 11/988,222

(22) PCT Filed: Mar. 14, 2006

(86) PCT No.: PCT/JP2006/304994
§ 371 (c)(1),
(2), (4) Date: Jan. 3, 2008

(87) PCT Pub. No.: WO2007/007444
PCT Pub. Date: Jan. 18, 2007

(65) Prior Publication Data
US 2009/0110212 A1   Apr. 30, 2009

(30) Foreign Application Priority Data
Jul. 8, 2005 (JP) .................. 2005-199683

(51) Int. Cl.
H04R 5/02 (2006.01)
H04M 3/42 (2006.01)

(52) U.S. Cl. .................... 381/310; 379/202.01

(58) Field of Classification Search ........... 381/310
See application file for complete search history.

(56) References Cited

U.S. PATENT DOCUMENTS

| 5,335,011 | A | 8/1994 | Addeo et al. |
| 5,991,385 | A * | 11/1999 | Dunn et al. ............ 379/202.01 |
| 6,850,496 | B1 * | 2/2005 | Knappe et al. .............. 370/260 |
| 7,054,451 | B2 * | 5/2006 | Janse et al. ..................... 381/83 |
| 2004/0114772 | A1 * | 6/2004 | Zlotnick ........................ 381/92 |
| 2004/0170284 | A1 * | 9/2004 | Janse et al. ..................... 381/66 |
| 2005/0008169 | A1 * | 1/2005 | Muren et al. .................. 381/92 |
| 2005/0147261 | A1 * | 7/2005 | Yeh ................................. 381/92 |

FOREIGN PATENT DOCUMENTS

| GB | 2 342 802 A | 4/2000 |
| WO | WO 97/48252 | 12/1997 |
| WO | WO 03/015407 A1 | 2/2003 |

OTHER PUBLICATIONS

European Patent Office: "Extended European Search Report" for Application Serial No. 06715653.9 dated Dec. 18, 2009; 7 pages.

* cited by examiner

*Primary Examiner* — Lincoln Donovan
*Assistant Examiner* — Alexander Talpalatskiy
(74) *Attorney, Agent, or Firm* — Pillsbury Winthrop Shaw Pittman LLP

(57) ABSTRACT

In an audio transmission system, a control section of a communication conference device emits measurement sound waves from a loudspeaker array to a terminal unit and measures the time until a response is received, thereby detecting the position of the terminal unit. The control section sets directivity characteristics so that microphone sensitivity of the microphone array is brought to point to the position of the terminal unit, and sends the collected audio to another communication conference device. In a communication conference device on the reception side, the directivity characteristic of the loudspeaker array is set so that the received audio appears as if it was emitted from the position of the terminal unit on the transmission side.

4 Claims, 9 Drawing Sheets

FIG. 1
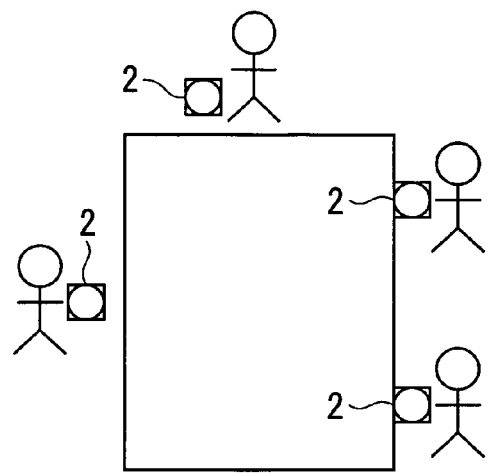
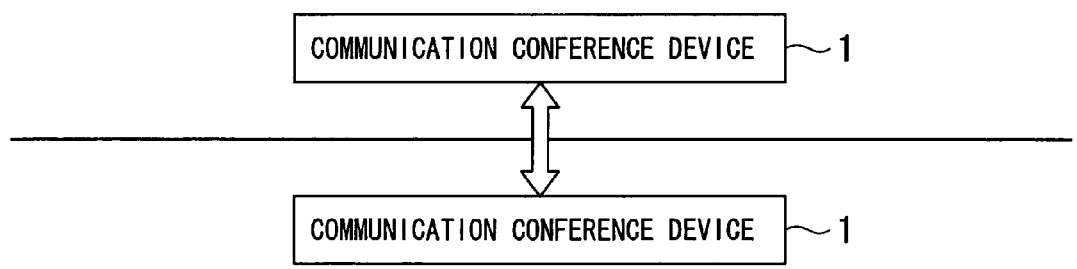
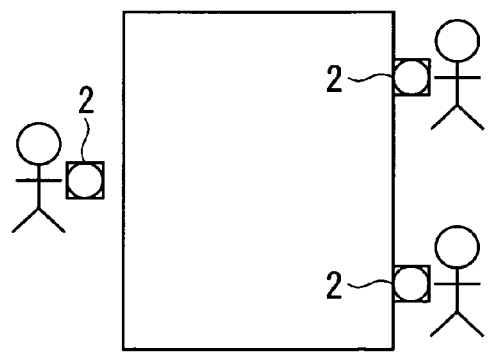

ACTUAL DISTANCE

DELAY

DELAY

FIG.5A

| HEADER PORTION | DATA SECTION | | | | FOOTER PORTION |
|---|---|---|---|---|---|
| XXXXXX | POSITION INFORMATION ABSENCE | POSITION INFORMATION X | POSITION INFORMATION Y | AUDIO DATA | YYYYYY |

FIG.5B

| HEADER PORTION | DATA SECTION | | | | | FOOTER PORTION |
|---|---|---|---|---|---|---|
| XXXXXX | IDENTIFICATION ID 1 | POSITION INFORMATION X | POSITION INFORMATION Y | IDENTIFICATION ID 2 | ~ | YYYYYY |

FIG.5C

| HEADER PORTION | DATA SECTION | | | | FOOTER PORTION |
|---|---|---|---|---|---|
| XXXXXX | IDENTIFICATION ID 1 | AUDIO DATA | IDENTIFICATION ID 2 | AUDIO DATA | YYYYYY |

FIG.5D

| HEADER PORTION | DATA SECTION | | | | FOOTER PORTION |
|---|---|---|---|---|---|
| XXXXXX | POSITION INFORMATION CHANGE | IDENTIFICATION ID 1 | POSITION INFORMATION X | POSITION INFORMATION Y | YYYYYY |

US 8,208,664 B2

AUDIO TRANSMISSION SYSTEM AND COMMUNICATION CONFERENCE DEVICE

This application is the National Phase of International Application PCT/JP2006/304994, filed Mar. 14, 2006 which designated the U.S. and that International Application was not published under PCT Article 21(2) in English.

TECHNICAL FIELD

The present invention relates to an audio transmission system, in particular, to an audio transmission system that detects a position of a sound source and performs sound field control to create a high level of presence.

Priority is claimed on Japanese Patent Application No. 2005-199683, filed Jul. 8, 2005, the content of which is incorporated herein by reference.

BACKGROUND ART

In general, a communication conference system is configured such that audio of conference participants is collected by a plurality of microphones, and is mixed and then transmitted. On the reception side, the audio is reproduced from all of loudspeakers at an equal level of sound volume and phase. In the case of such a communication conference system, the audio data is reproduced with a same sound image regardless of who is speaking among the conference participants. As a result, it is difficult on the reception side to identify who spoke.

Moreover, on the reception side, since the sound volume of a loudspeaker is fixed, the sound volume from the loudspeaker significantly fluctuates when there is a plurality of conference participants on the transmission side, due to differences in the audio sound volume of the respective participants and in the distance between microphones and the participants.

Based on such circumstances, there has been proposed a voice telephone conference device that determines a speaker and the position of the speaker based on the temporal waveform and the frequency spectrum of a microphone input signal (for example, refer to Patent Document 1).

Patent Document 1: Japanese Unexamined Patent Application, First Publication (JP-A) No. H09-261351

The voice telephone conference device disclosed in Patent Document 1 determines a speaker and the position of the speaker based on the temporal waveform and the frequency spectrum of a microphone input signal, and transmits position information along with audio data. The reception side controls the sound volume of each loudspeaker based on the received position information. Moreover, there is provided a switch for switching to select audio data with a highest input level among the respective microphones, and the reception side is set so that the audio is emitted from the loudspeaker that corresponds to the microphone that collected the audio.

However, a sound field with a high level of presence (for example, a feel of depth) can not be realized by only controlling the sound volumes of the respective loudspeaker (stereo loudspeaker units) based on the position information.

Furthermore, each of the microphones is provided with the switch for switching to select audio data with a highest input level among the respective microphones. However, there is an issue in that when a plurality of speakers start speaking simultaneously, this switching needs to be performed in a short period of time, and accurate audio data cannot be transmitted as a result.

DISCLOSURE OF INVENTION

Therefore, it is an object of the present invention to provide an audio transmission system that is able to control a sound field having a high level of presence with a simple configuration.

An audio transmission system of the present invention comprises: a microphone array having a plurality of microphones installed in a first location; a loudspeaker array having a plurality of loudspeaker units installed in a second location; a position detection device that detects a position of a sound source present in the first location; a microphone side signal processing device that sets a directivity characteristic of the microphone array so as to point to the position of the sound source detected by the position detection device; a transmission device that transmits audio data collected by the microphone array with the above mentioned directivity characteristic, along with the information of the directivity characteristic; a reception device that receives the audio data transmitted by the transmission device along with the directivity characteristic information; and a loudspeaker side signal processing device that sets the directivity characteristic of the loudspeaker array based on the directivity characteristic information so that a virtual sound source is formed in the sound source position in the first location.

In the present invention, the position of the sound source in the first location (transmission side) is identified, and the directivity characteristic of microphone sensitivity is set to point to the identified position. The collected audio data is transmitted to the second location (reception side) along with the directivity characteristic. On the reception side, a virtual sound source is formed in the sound source position on the transmission side, based on the directivity characteristic. For example, when a speaker in a position in the right side back when seen from the reception side (left side front on the transmission side) speaks, the audio is reproduced from right side.

Moreover, the audio transmission system of the present invention comprises: a first microphone array having a plurality of microphone units installed in a first location; a second loudspeaker array having a plurality of loudspeaker units installed in a second location; a first position detection device that detects the position of a sound source present in the first location; a first microphone side signal processing device that sets a directivity characteristic of the first microphone array to the position of the sound source detected by the first position detection device; a first transmission device that transmits audio data collected by the first microphone array with the above mentioned directivity characteristic, along with directivity characteristic information; a second reception device that receives the audio data transmitted by the first transmission device along with directivity characteristic information; a second loudspeaker side signal processing device that sets the directivity characteristic of the second loudspeaker array so that a virtual sound source is formed in the sound source position in the first location based on the directivity characteristic information; a second microphone array having a plurality of microphone units installed in the second location; a first loudspeaker array having a plurality of loudspeaker units installed in the first location; a second position detection device that detects the position of a sound source present in the second location; a second microphone side signal processing device that sets the directivity characteristic of the second microphone array to point to the position of the sound source detected by the second position detection device; a second transmission device that transmits the audio data collected by the second microphone array with the directivity characteristic, along with the directivity characteristic information; a first reception device that receives the audio data transmitted by the second transmission device along with directivity characteristic information; and a first loudspeaker side signal processing device that sets the directivity characteristic of the first loudspeaker array so that a virtual sound source is formed in the position of the sound source in the second location, based on the directivity characteristic information.

In the present invention, the collected audio data is transmitted, along with its directivity characteristic, from the first location to the second location, and on the other hand, the collected audio data is transmitted, along with its directivity characteristic, from the second location to the first location. In the first location and the second location, virtual sound sources are formed respectively on the reception side in the positions corresponding to positions of the sound sources on the transmission side.

In the present invention, the position detection device may detect a plurality of sound source positions; the microphone side signal processing device may set the directivity characteristic of the microphone array respectively to point to a plurality of the sound source positions; the information transmission device may transmit a plurality of audio data along with their respective directivity characteristic information; the information reception device may receive a plurality of the audio data along with their respective directivity characteristic information; and the loudspeaker side signal processing device may set the directivity characteristic of the loudspeaker array so that virtual sound sources are formed in a plurality of sound source positions.

In this case, the audio transmission system detects a plurality of the sound source positions on the transmission side to set the directivity characteristic of microphone sensitivity. Moreover, this system transmits a plurality of collected audio data along with their respective directivity characteristics to the reception side. On the reception side, virtual sound sources are formed respectively on the reception side in a plurality of the sound source positions corresponding to those on the transmission side, based on their respective directivity characteristics.

A communication conference device of the present invention integrally comprises: the first microphone array; the first loudspeaker array; the first position detection device; the first microphone side signal processing device; the first transmission device; the first reception device; and the first loudspeaker side signal processing device.

As described above, according to the present invention, on the transmission side, the position of a sound source is identified and the directivity characteristic of microphone sensitivity is set to point to the sound source, and on the reception side, the directivity characteristic of the loudspeaker array is set so that a virtual sound source is formed on the reception side in the sound source position corresponding to that on the transmission side. As a result, a communication conference having a high level of presence can be realized with a simple configuration.

BRIEF DESCRIPTION OF THE DRAWINGS

FIG. 1 is schematic diagram showing a configuration of a communication conference system according to an embodiment of the present invention.

FIGS. 5A, 5B, 5C, and 5D are diagrams showing examples of transmitted/received packets used in the embodiment of the present invention.

BEST MODE FOR CARRYING OUT THE INVENTION

FIG. 1 is schematic diagram showing a configuration of a communication conference system according to an embodiment of the present invention. As shown in FIG. 1, this communication conference system comprises; communication conference devices 1 that are installed respectively in a plurality of conference rooms, and terminal units 2 that are carried by respective conference participants.

The communication conference devices 1 are installed in the respective conference rooms. The communication conference devices 1 are respectively connected via a network (LAN or Internet) or a telephone line. The terminal units 2 are remote controllers that are carried by all conference participants. A conference participant uses this terminal unit 2 to notify the commencement of a conference. This terminal unit 2 may be carried by each of conference participants, or it may be installed on a desk. Moreover, it is not necessary to provide terminal units 2 for all conference participants, and one or more of the terminal units 2 may to be provided for each conference room.

Figure 2:
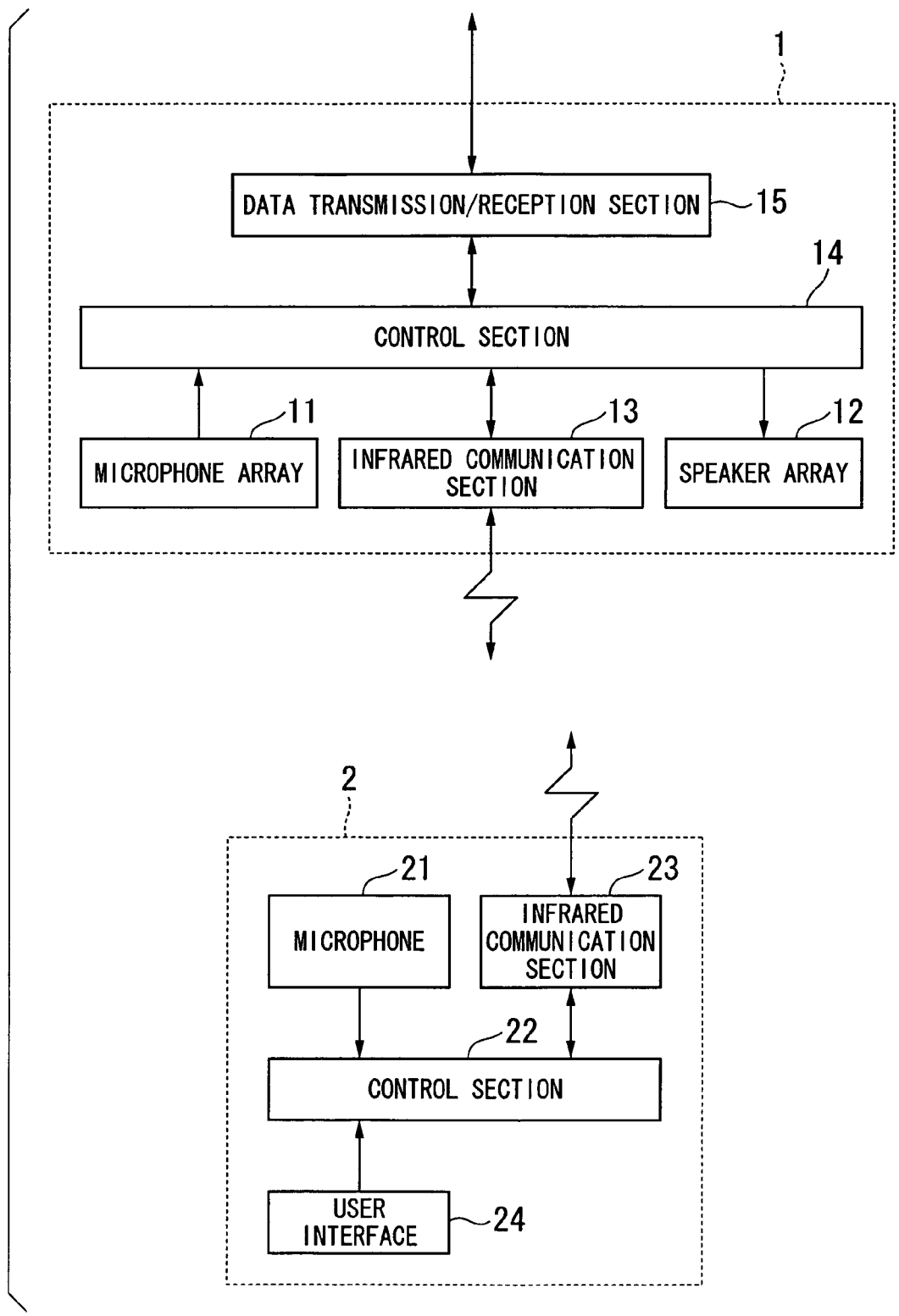
FIG. 2 is block diagram showing a communication conference device and a terminal unit according to the embodiment of the present invention.

FIG. 2 is a block diagram showing a configuration of the communication conference device 1 and the terminal unit 2. As shown in FIG. 2, the communication conference device 1 comprises: a microphone array 11 that collects audio; a loudspeaker array 12 that outputs audio; an infrared communication section 13 that communicates with the terminal unit 2; a control section 14 that controls the communication conference device 1; and a data transmission/reception section 15 that communicates with other communication conference devices. The terminal unit 2 comprises: a terminal unit microphone 21 that receives audio input; a terminal unit control section 22 that controls the terminal unit; a terminal unit infrared communication section 23 that communicates with the communication conference device 1; and a user interface 24 on which a user performs operation input.

The control section 14 of the communication conference device 1 is connected to the microphone array 11, the loudspeaker array 12, the infrared communication section 13, and the data transmission/reception section 15. Moreover, the terminal unit control section 22 is connected to the terminal unit microphone 21, the terminal unit infrared communication section 23, and the user interface 24.

The control section 14 of the communication conference device 1 controls the directivity characteristics of the microphone array 11 and the loudspeaker array 12. The microphone array 11 and the loudspeaker array 12 are configured such that a plurality of microphone units (loudspeaker units) is arranged in a matrix form (or, in a line form or a honeycomb form). As a result, their directivity characteristics can be controlled by controlling their delay amounts.

For example, if audio is outputted from a loudspeaker unit on an end section first and then the audio is outputted sequentially from adjacent loudspeaker units with a predetermined delay time, then the synthesis wave front of these audios inclines according to their delay time. As a result, a sound beam can be brought to point in a diagonal direction. Thus, by controlling the delay amounts of the loudspeaker array, a sound image can be positioned with respect to the conference participants in front of the communication conference device 1.

Similarly, in the microphone array, by controlling the delay amounts of the respective microphone units, microphone sensitivity can be brought to point in a predetermined direction.

The control section 14 transmits audio data inputted from the microphone array to the data transmission/reception section 15. The control section 14 has a built-in A/D converter as necessary, and transmits the collected audio data to the data transmission/reception section 15. The data transmission/reception section 15 transmits the audio data to the data transmission/reception section 15 of the network-connected communication conference device 1 in another conference room. The data transmission/reception section 15 in another conference room that has received the audio data transmits the audio data to the connected control section 14. Having received the audio data, the control section 14 D/A converts the audio data and outputs it to the loudspeaker array 12, thereby outputting the audio. Thus, the audio emitted from a conference participant is collected by the microphone array 11, and is emitted from the loudspeaker array 12 in another conference room.

The terminal unit control section 22 performs various kinds of operations according to the control inputted from the user interface 24. When a conference participant notifies the commencement of a conference from the user interface 24, the terminal unit control section 22 transmits a notification of the conference commencement to the communication conference device 1 via the terminal unit infrared communication section 23. The control section 14 of the communication conference device 1 that has received the notification of conference commencement via the infrared communication section 13 transmits a connection request to another conference room to the data transmission/reception section 15. The data transmission/reception section 15 starts communicating with the data transmission/reception section 15 in another conference room.

Moreover, when a conference participant instructs a sound volume change from the user interface 24, the terminal unit control section 22 transmits instruction information of the sound volume change to the communication conference device 1 via the terminal unit infrared communication section 23.

The terminal unit microphone 21 is for receiving sound waves from the communication conference device 1. The communication conference system of the present embodiment performs operations as described below. The control section 14 emits sound waves from any one of the loudspeaker units of the loudspeaker array 12 and starts a counter (timer). Having received these sound waves via the terminal unit microphone 21, the terminal unit control section 22 transmits the received signal to the communication conference device 1 via the terminal unit infrared communication section 23.

Having received the received signal via the infrared communication section 13, the control section 14 stops the counter, and measures the distance between the loudspeaker unit and the terminal unit 2 by measuring the time elapsed from the emission of the sound waves to the reception of the received signal. Such a distance measurement is carried out for a plurality of the loudspeaker units, thereby identifying the position of the terminal unit 2.

Figure 3:
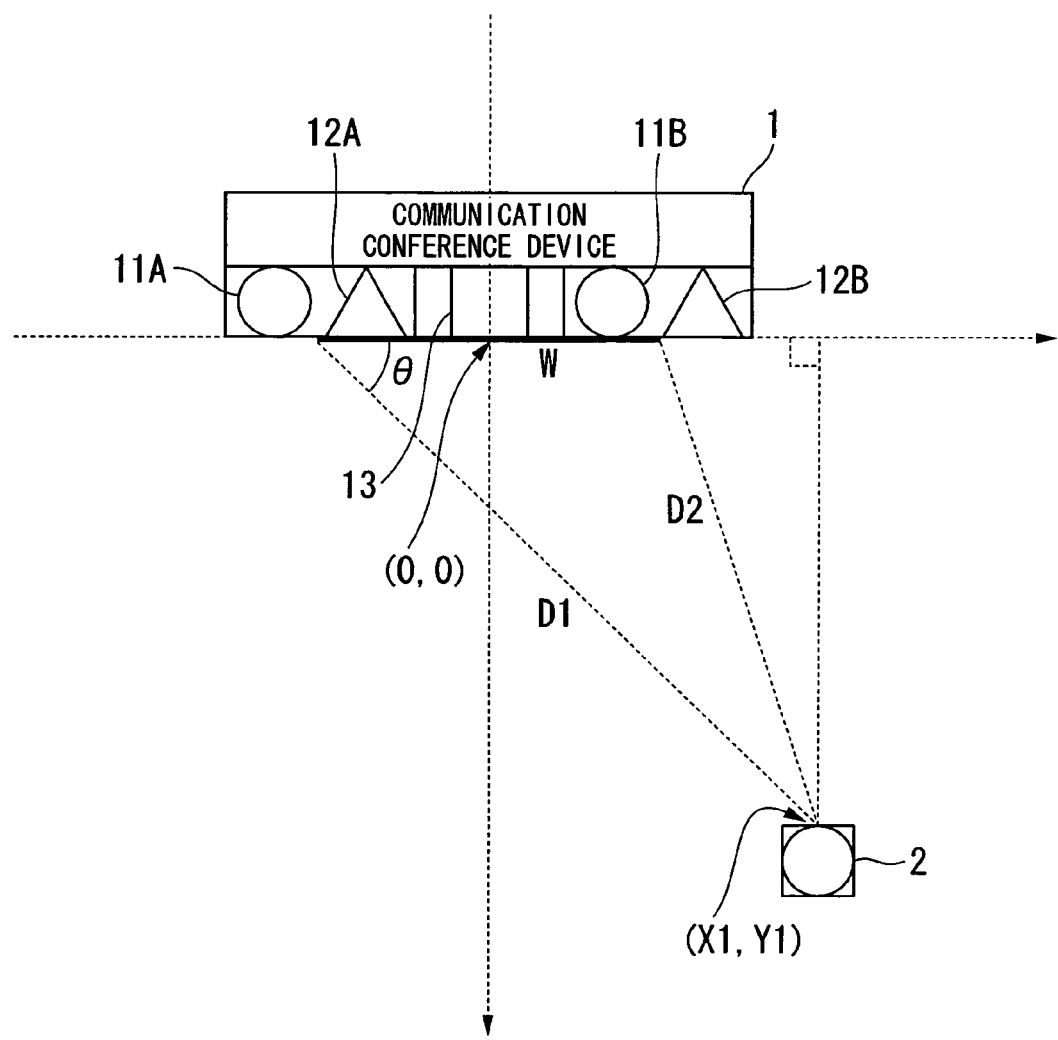
FIG. 3 is a diagram showing position measurement of the terminal unit shown in FIG. 2.

FIG. 3 shows position measurement of the terminal unit in detail. As shown in FIG. 3, on the front face of the communication conference device 1, there are provided a plurality of (two in FIG. 3) microphone units 11A (and microphone unit 11B) and a plurality of loudspeaker units 12A (and loudspeaker unit 12B).

In FIG. 3, reference symbol W denotes a distance between: the center position of the microphone unit 11A and the loudspeaker unit 12A; and the center position of the other microphone unit 11B and the loudspeaker unit 12B. Moreover, reference symbol D1 denotes a distance between: the center position of one microphone unit 11A and the loudspeaker unit 12A; and the terminal unit 2, and reference symbol D2 denotes a distance between: the center position of the other microphone unit 11B and the loudspeaker unit 12B; and the terminal unit 2. The internal angle at the vertex between W and D1 is θ.

This θ can be found by the following equation (1) using the cosine theorem.

$$D2^2 = D1^2 + W^2 - 2 \times D1 \times W \times \cos(\theta) \quad (1)$$

Here, the coordinate of the center position of the communication conference device 1 is (0, 0). Accordingly, the coordinate (X1, Y1) of the position in which the terminal unit 2 exists is expressed as the following equation (2).

$$X1 = D1 \times \cos(\theta) - W/2$$

$$Y1 = D1 \times \sin(\theta) \quad (2)$$

Thus, the communication conference device 1 can measure the position of the terminal unit 2. This position measurement is carried out for all of the terminal units 2 if there are provided a plurality of the terminal units 2. In the case where each of the conference participants has the terminal unit 2, the position in which each of the terminal units 2 exists is taken as the positions of the conference participant. Moreover, in the case where the number of the terminal units 2 is less than that of the conference participants, or there is one terminal unit 2 present, the above mentioned position measurement is carried out for the position of each of the respective conference participants, and the information of each of the measured positions is stored as the position of the conference participant into a memory (not shown in the diagram) of the communication conference device 1.

Position measurement is not limited to the above method, and it may be carried out by other methods such as identifying a position by image recognition for example.

Based on the information relating to the position of the terminal unit 2 measured as described above, the control section 14 controls the directivity characteristic of the microphone array 11. For example, the directivity characteristic of the microphone array 11 is set so that the sensitivity of the microphone array 11 points to the position of the terminal unit 2, thereby efficiently collecting audio of a speaker. Moreover, for a position far distanced from the communication conference device 1, the gain of the microphone array 11 is raised.

Furthermore, the position informations of the respective terminal units 2 (position information of the conference participants) are transmitted to the communication conference device 1 in another conference room. The control section 14 of the communication conference device in another conference room sets the directivity characteristic of the loudspeaker unit 12 according to the received position information of the terminal unit 2. As mentioned above, since the coordinate of the position of the terminal unit 2 (conference participant) on the transmission side can be identified, the directivity characteristic of the loudspeaker array is controlled to position a sound image so that the audio appears as if it is emitted from this position coordinate when seen from the reception side.

Figure 4A:
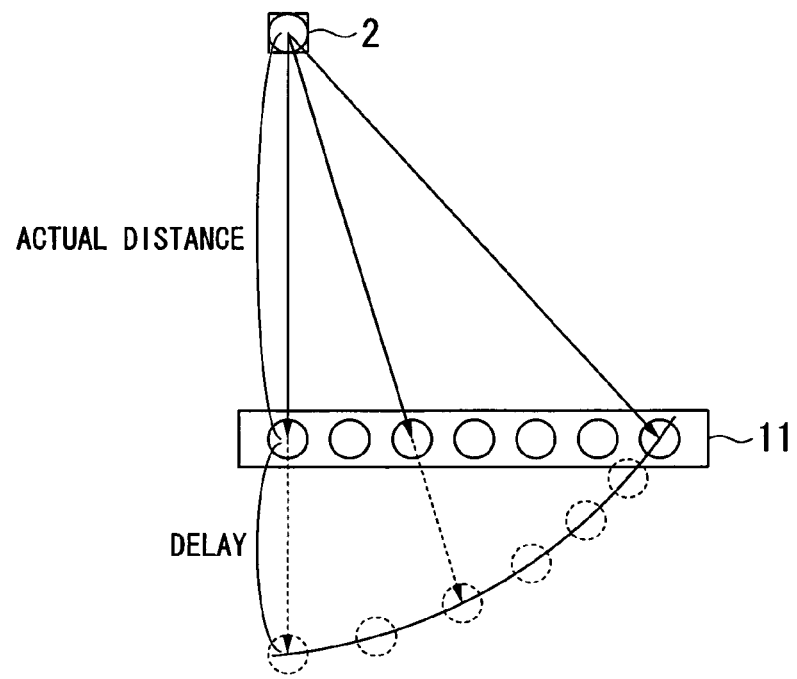
FIG. 4A is a diagram for explaining a directivity characteristic of a microphone array on the transmission side in the embodiment of the present invention.
Figure 4B:
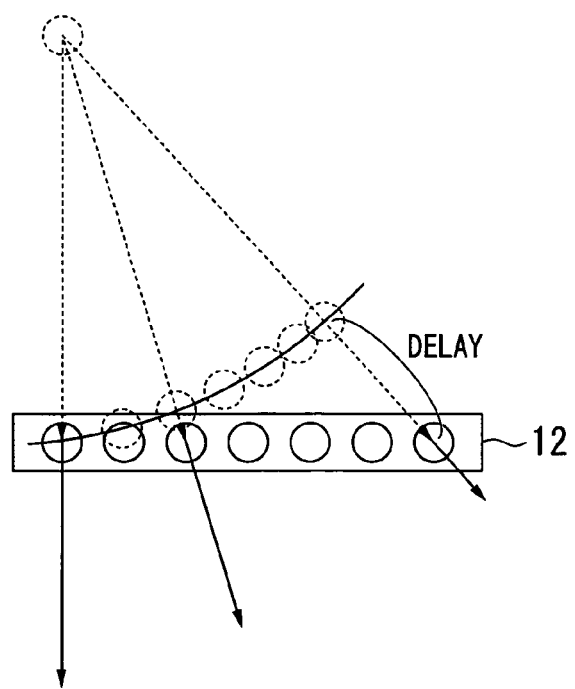
FIG. 4B is a diagram for explaining a directivity characteristic of a loudspeaker array on the reception side in the embodiment of the present invention.

FIG. 4A and FIG. 4B are diagrams for explaining directivity characteristics. FIG. 4A is a diagram showing the directivity characteristic of the microphone array 11 on the transmission side. In FIG. 4A, the audio emitted by a conference participant reaches the microphone units sequentially from the closest one, and delays are given to the respective microphone units so that the audio emitted from the sound source is outputted with the same phase. Since the audio is outputted from the each of the microphone units with the same phase, the audio is accentuated when these audio data are mixed. Here, the audio emitted from another position is outputted from each of the microphone units with a different phase and is therefore offset when mixed. As a result, the primary sensitivity of the microphone can brought to point to the direction of the sound source.

FIG. 4B is a diagram showing the directivity characteristic of the loudspeaker array 12 on the reception side. In FIG. 4B, the received audio data is outputted from each of the loudspeaker units. At this time, a virtual sound source is formed due to a positional relationship between the communication conference device 1 and the terminal unit 2 shown in FIG. 4A. Audio is outputted from the loudspeaker unit in a position closest to this virtual sound source first, and then it is outputted from the adjacent loudspeaker units sequentially with delays. As described above, by sequentially giving delays to the outputs, a sound image can be positioned as if the audio is emitted from the position of the speaker.

Data that are transmitted and received between the communication conference devices 1 for carrying out such control are described. FIG. 5A to FIG. 5D are diagrams showing examples of transmitted/received packets. The communication conference device 1 performs transmission/reception of packets using TCP/IP. The header portion and the footer portion shown in these diagrams are headers and footers of TCP/IP (information for communication control).

FIG. 5A shows an example of a packet that includes audio data. As shown in FIG. 5A, the data portion includes position information absence data, position information X, position information Y, and audio data. The position information absence data is data that shows whether or not the packet includes position information (position coordinates) of each of the conference participants mentioned above, and by making reference to this, the control section 14 of the communication conference device 1 determines whether or not it controls the directivity characteristic of the loudspeaker array 12. In the case where the position information absence data indicates that the packet does not include position information, the received audio data are uniformly reproduced from all of the loudspeaker units.

The position information X and the position information Y are data that show the position coordinates of the respective conference participants mentioned above. The control section 14 controls the directivity characteristic of the loudspeaker array 12 based on this information, thereby positioning a sound image as if the audio is heard from this position.

Moreover, position information may be transmitted and received when a conference is commenced, and information for identifying the respective conference participants and audio data may be added to the data portion to be transmitted and received during the conference.

FIG. 5B is a diagram showing an example of a packet transmitted and received when a conference is commenced. FIG. 5C is a diagram showing an example of a packet transmitted and received during a conference. As shown in FIG. 5B, when commencing a conference, identification information for identifying each of the conference participants and position information that corresponds to this identification information are transmitted and received. Having received this packet, the control section 14 stores the identification information of the respective conference participants and the position information in the memory with establishing an association or correspondence between them.

As shown in FIG. 5C, during the conference, identification information for identifying each of the conference participants and audio data that corresponds to this identification information are transmitted and received. Having received this packet, the control section 14 makes reference to the position information in the memory that corresponds to the received identification information, and controls the directivity characteristic of the loudspeaker array 12 based on this position information and reproduces the received audio data.

In the case where the position of the conference participant has changed during the conference, a packet that indicates a position information change is transmitted and received. FIG. 5D shows an example of a packet that indicates a position information change. As shown in FIG. 5D, in the case where the position of the conference participant has changed during the conference, position information change data that indicates that it is a position information change packet, identification information for identifying the conference participant whose position has been changed, and position information that corresponds to this identification information are transmitted and received. Having received this packet, the control section 14 updates the content of the memory while establishing an association between the received identification information and the position information.

In the case where the number of the microphone units in the microphone array on the transmission side (audio collection side) is equivalent to that in the loudspeaker array on the reception side (reproduction side) and their array arrangements are the same (the respective loudspeaker units and the respective microphone units correspond to each other on a one-to-one basis), then by making the delay amount of the microphone array the same as that of the loudspeaker array, a sound image can be positioned as if the audio is emitted from the position of the speaker without transmission/reception of the position information.

Figure 6:
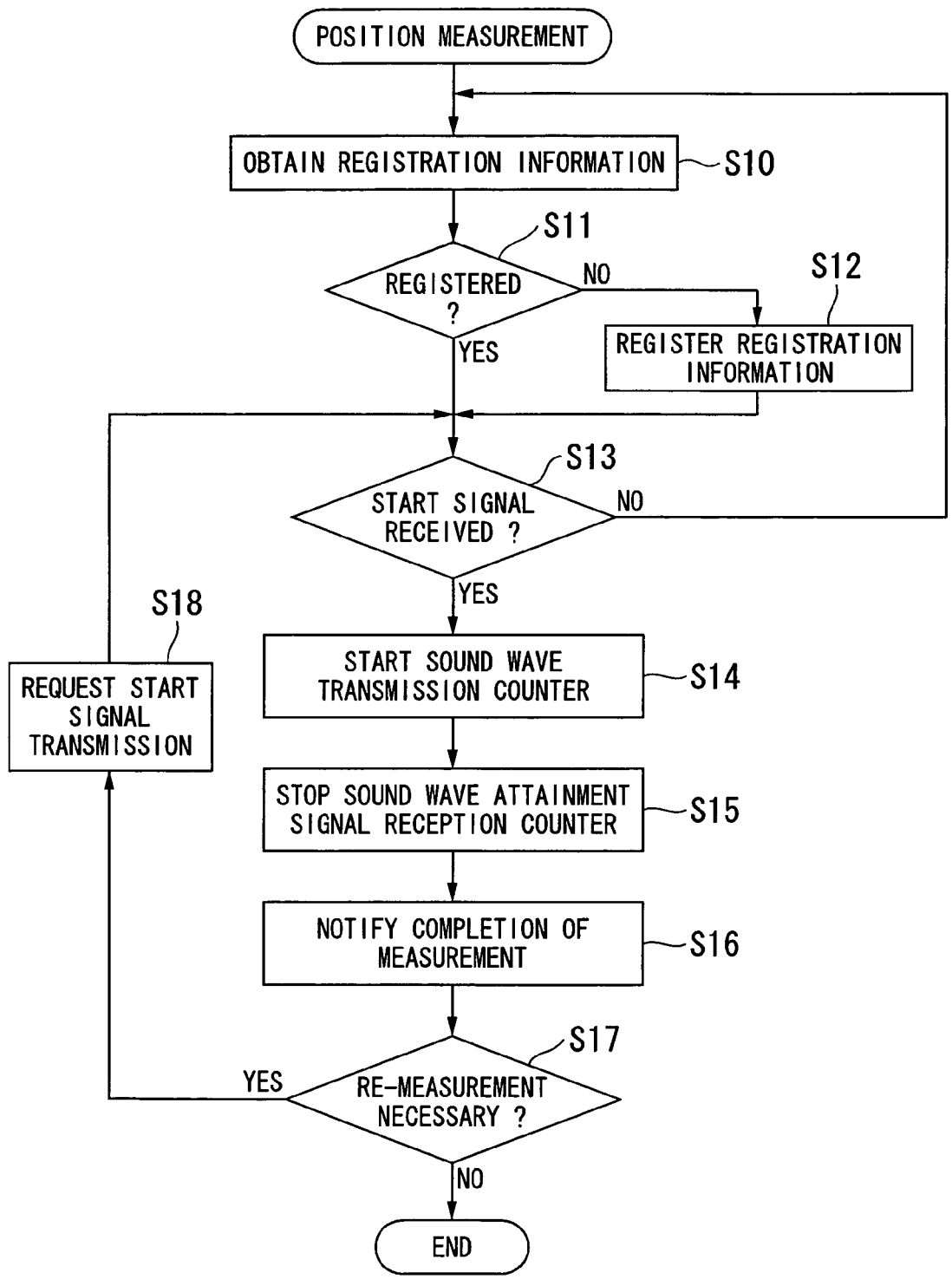
FIG. 6 is a flow chart showing a position measurement operation in the embodiment of the present invention.

Next, an operation of the communication conference system of the present embodiment is described in detail. FIG. 6 is a flow chart showing a position measurement operation. This operation is performed when a position measurement mode is preliminarily instructed by a conference participant using the terminal unit 2 before a conference commences. First, registration information is obtained from the terminal unit 2 (S10). The registration information is information that indicates the presence of each of the terminal units 2 and is transmitted from each of the terminal units 2. By receiving this registration information, the communication conference device 1 can recognize the number of the terminal units 2 within a conference room. The registration information is stored in the built-in memory of the communication conference device 1.

Whether or not the received registration information has been registered within the memory is determined (S11), and if the registration information has not been registered, then it is registered in the memory (S12). If the registration information has been registered, then the process of s12 is skipped and the flow proceeds to the next process.

Subsequently, it is determined whether or not a start signal has been received from the terminal unit 2 (S13). If the start signal has not been transmitted from the terminal unit 2, the processing from obtaining the registration information is repeated.

If the start signal has been transmitted from the terminal unit 2 and this signal has been received, measurement sound waves are emitted from any one of the loudspeaker units of the loudspeaker array 12 to start the counter (S14). These measurement sound waves may be any type of sound waves. However, for example in this case they are non-audible sine waves. Subsequently, the terminal unit 2 transmits a sound wave attainment signal that indicates an attainment of the sound waves from the terminal unit 2 that has detected the sound waves, and this signal is received and the counter is stopped (S15). The distance from the terminal unit 2 is thereby measured. Having received the sound wave attainment signal, the terminal unit 2 is notified of a completion of the measurement (S16).

Then, it is determined whether or not measurement needs to be performed again (S17). Since the communication conference device 1 manages the number of the terminal units 2 in the conference room when the registration information is obtained, it determines that a re-measurement is not necessary if the distance from all of the terminal units 2 has been measured. If there is any terminal unit 2, the distance from which has not been measured, the communication conference device 1 notifies the terminal unit 2 of a start signal transmission request (S18), and then the operation repeats processes according to a determination of whether or not the start signal has been received (S18→S13). If it is determined that a re-measurement is not necessary, the operation terminates.

Figure 7:
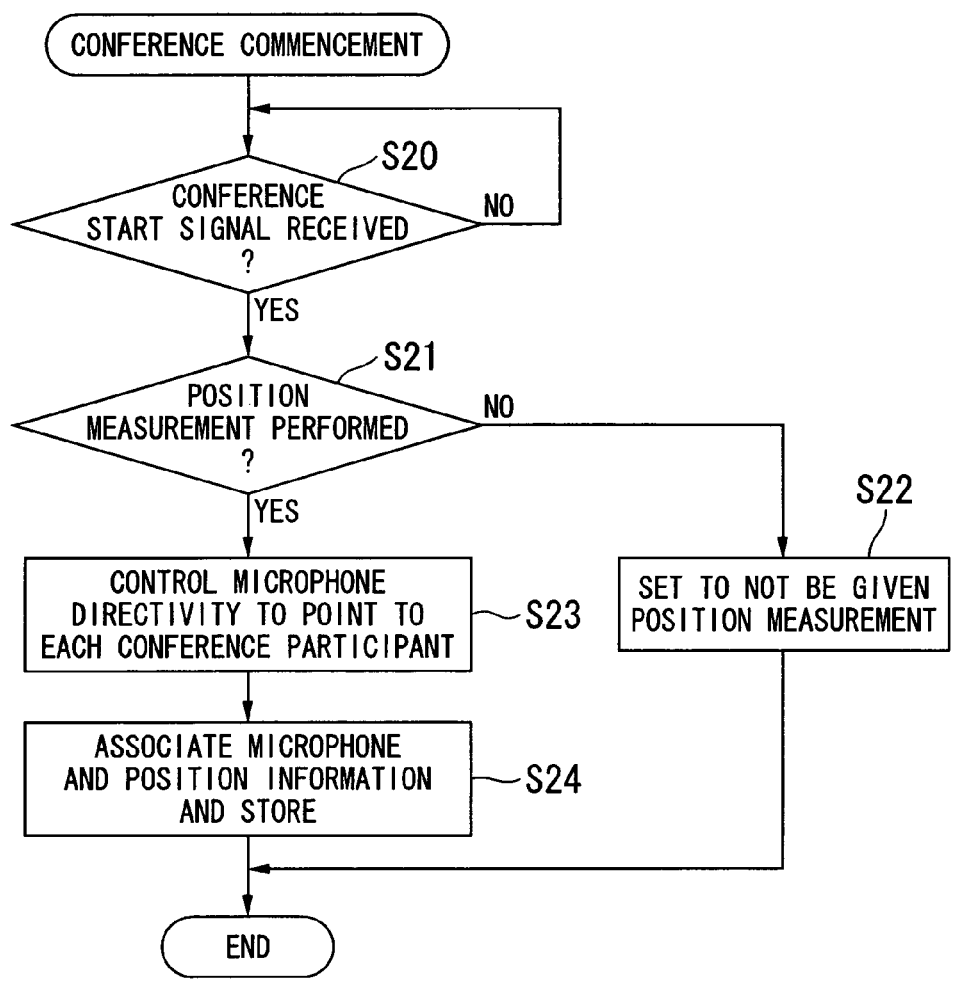
FIG. 7 is a flow chart showing an operation at the time of conference commencement in the embodiment of the present invention.

FIG. 7 is a flow chart showing an operation at the time of commencing a conference. First, it is determined whether or not a conference start signal has been received from the terminal unit 2 (S20). This determination process is repeated until the conference start signal has been received. Once the conference start signal has been received, it is determined whether or not a position measurement for the terminal unit 2 has been performed (S21). If a position measurement has not been performed, the packets that are transmitted/received during the conference are set to not be given position information (S22). If a position measurement has not been performed, as with a generic communication conference system, the audios collected by the respective microphone units are mixed and then transmitted to another conference room so as to be reproduced from all of the loudspeaker units at a uniform sound volume.

If a position measurement has been performed, the delay amounts of the respective microphone units are set based on the position information so that the microphone sensitivity points to each of the conference participants (S23), and subsequently, the respective position information and the delay amounts of the respective microphone units are associated with each other and stored in the memory (S24).

Figure 8:
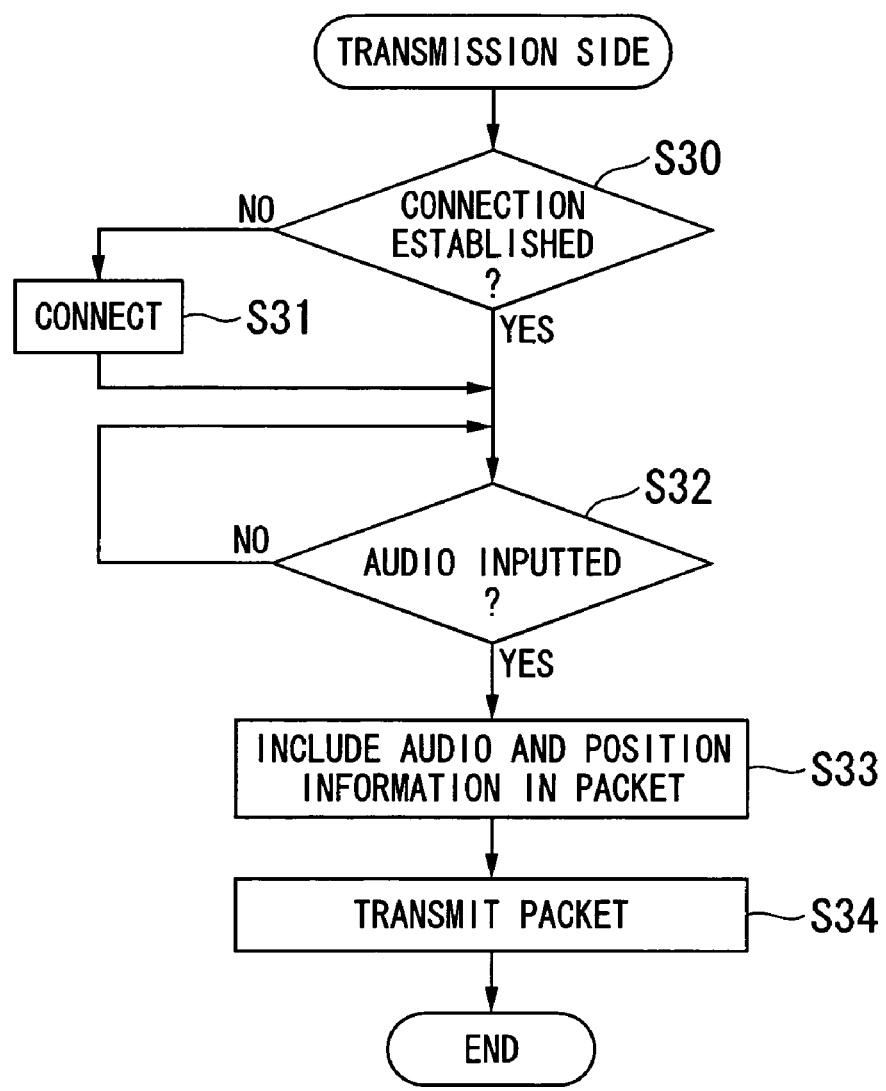
FIG. 8 is a flow chart showing an operation on the transmission side in the embodiment of the present invention.
Figure 9:
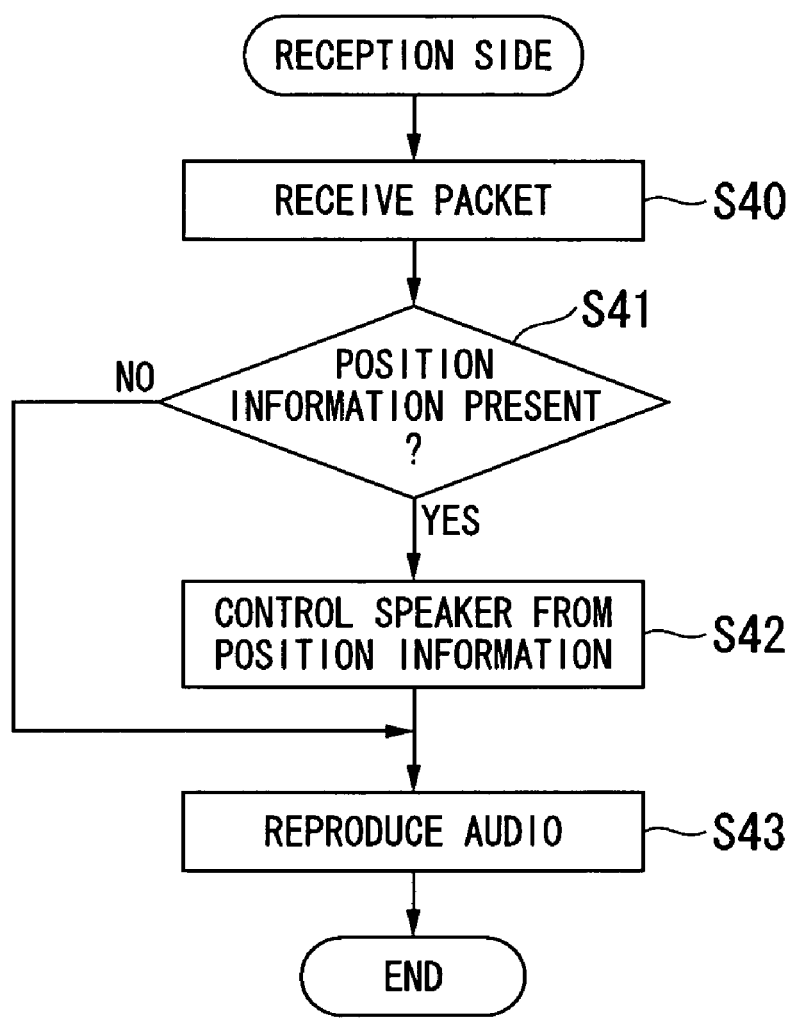
FIG. 9 is a flow chart showing an operation on the reception side in the embodiment of the present invention.

Next, an operation during a conference is described. FIG. 8 is a flow chart showing an operation on the transmission side. FIG. 9 is a flow chart showing an operation on the reception side. In FIG. 8, it is determined whether or not a connection with the communication conference device 1 on the reception side of another conference room has been established (S30).

If a connection has not been established with the communication conference device in another conference room, a connection is commenced (S31). If a connection has been established, the flow proceeds to the next process.

Subsequently, it is determined whether or not audio has been inputted (S32), and this process is repeated until audio is inputted. Once audio is inputted, the inputted audio data and the position information are included in a packet (S33) so as to be transmitted to the communication conference device 1 on the reception side (S34).

In FIG. 9, the communication conference device 1 on the reception side receives the transmitted packet (S40). It is determined whether or not the packet includes position information (S41). If position information is included, the directivity characteristic of the loudspeaker array 12 is controlled according to this position information (S42). Subsequently, the audio is reproduced (S43). If position information is not included, then the directivity characteristic of the loudspeaker array 12 is not controlled, and the audio is reproduced from the entire loudspeaker array 12 with a uniform sound volume and delay amount (S41→S43).

In the case where the number of the microphone units in the microphone array on the transmission side is equal to the number of the loudspeaker units in the loudspeaker array on the reception side and their array arrangements are the same (the respective loudspeaker units and the respective microphone units correspond to each other on a one-to-one basis), by making their delay amount equal to each other, a sound image can be positioned without transmitting/receiving the position information.

As described above, in the communication conference system of the present embodiment, positions of conference participants are identified by measuring the distance between the communication conference device 1 and the terminal unit 2, and by transmitting/receiving this position information, a sound image can be positioned on the reception side as if the speech audio is emitted from the position of the speaker. As a result, a sound field control with a high level of presence becomes possible. Moreover, in the case of transmitting/receiving video data of a video telephone or the like, audio can be controlled so as to appear as if it is emitted from the speaker in the video image, thereby realizing a communication conference system with a further high level of presence.

Sound image positioning is not limited to the example of the sound image position control that makes audio appear as if it is emitted from the position of the speaker on the transmission side. For example, sound image positioning may be performed by only controlling the sound image position horizontally, without considering the depth (Y-coordinate) of the sound image.

Industrial Applicability

The present invention can be applied to an audio transmission system such as a communication conference system in which sound field control with a high level of presence is performed by detecting the position of a sound source. According to the present invention, a communication conference with a high level of presence can be realized with a simple configuration.

The invention claimed is:
1. A communication conference device comprising:
a first microphone array having a plurality of microphone units installed in a first location;
a first loudspeaker array having a plurality of loudspeaker units installed in said first location;

a first signal processing device that detects a sound source position where a terminal is located in said first location, the sound source position being represented by a relative position to the communication conference device, and setting a directivity characteristic of said first microphone array at a point corresponding to the detected sound source position, wherein said first signal processing device detects said sound source position by measuring times elapsed from emission of sound waves emitted from said first communication conference device to reception of said sound waves received by said terminal;

a first transmission device that transmits first audio data collected by said first microphone array according to said directivity characteristic along with information indicative of said directivity characteristic; and a first reception device that receives second audio data transmitted by a second communication conference device along with directivity characteristic information, wherein the first signal processing device sets the directivity characteristic of said first loudspeaker array based on said directivity characteristic information received from the second communication conference device so that a virtual sound source is formed such that a position of the virtual sound source relative to the first communication conference device corresponds to the relative position of a sound source position relative to and detected by the second communication conference device.

2. An audio transmission system comprising:

a first communication conference device and a terminal installed in a first location; and a second communication conference device installed in a second location, said first communication conference device including:

a microphone array having a plurality of microphone units;

a first signal processing device that detects a sound source position where said terminal is located, the sound source position being represented by a relative position to the first communication conference device, and setting a directivity characteristic of said microphone array at a point corresponding to the detected sound position, wherein said first signal processing device detects said sound source position by measuring times elapsed from emission of sound waves emitted from said first communication conference device to reception of said sound waves received by said terminal; and a transmission device that transmits audio data collected by said microphone array according to said directivity characteristic along with information indicative of said directivity characteristic; and said second communication conference device including:

a reception device that receives the audio data transmitted by said transmission device along with directivity characteristic information;

a loudspeaker array having a plurality of loudspeaker units;

a second signal processing device that sets the directivity characteristic of said loudspeaker array based on said directivity characteristic information so that a virtual sound source is formed such that a position of the virtual sound source relative to the second communication conference device corresponds to the relative position of said detected sound source position relative to the first communication conference device.

3. An audio system according to claim 2, wherein:

said first signal processing device detects a first plurality of sound source position and sets the directivity characteristic of said microphone array respectively at points corresponding to the first plurality of sound source positions;

said transmission device transmits a first plurality of audio data along with their respective directivity characteristic information;

said reception device receives a second plurality of audio data along with their respective directivity characteristic information; and said second signal processing device sets the directivity characteristic of said loudspeaker array so that virtual sound sources are formed in a second plurality of sound source positions.

4. An audio transmission system comprising:

a first communication conference device and a terminal installed in a first location; and a second communication conference device and a second terminal installed in a second location, said first communication conference device including:

a first microphone array having a plurality of first microphone units;

a first signal processing device that detects a first sound source position where said terminal is located, the first sound source position being represented by a first relative position relative to the first communication conference device, and setting a directivity characteristic of said first microphone array at a point corresponding to the first detected sound source position, wherein said first signal processing device detects said first sound source position by measuring times elapsed from emission of sound waves emitted from said first communication conference device to reception of said sound waves received by said first terminal;

a first transmission device that transmits audio data collected by said first microphone array according to said first directivity characteristic along with information indicative of said first directivity characteristic;

a first loudspeaker array having plurality of first loudspeaker units; and a first reception device, and said second communication conference device including:

a second microphone array having a plurality of second microphone units;

a second signal processing device that detects a second sound source position where said second terminal is located, the second sound source position being represented by a second relative position relative to the second communication conference device, and setting a second directivity characteristic of said second microphone array at a point corresponding to the second detected sound source position, wherein said second signal processing device detects said second sound source position by measuring times elapsed from emission of sound waves emitted from said second communication conference device to reception of said sound waves received by said second terminal;

a second transmission device that transmits audio data collected by said second microphone array according to said second directivity characteristic along with information indicative of said second directivity characteristic;

a second loudspeaker array having plurality of second loudspeaker units; and a second reception device, wherein:

the second reception device receives the audio data transmitted by said first transmission device along with the first directivity characteristic information;

the second signal processing device sets the second directivity characteristic of said second loudspeaker array based on said first directivity characteristic information so that a first virtual sound source is formed such that a position of the first virtual sound source relative to the second communication conference device corresponds to the relative position of said detected first sound source position relative to the first communication conference device;

the first reception device receives the audio data transmitted by said second transmission device along with the second directivity characteristic information; and the first signal processing device sets the first directivity characteristic of said first loudspeaker array based on said second directivity characteristic information so that a second virtual sound source is formed such that a position of the second virtual sound source relative to the first communication conference device corresponds to the relative position of said detected second sound source position relative to the second communication conference device.

* * * * *